(12) United States Patent
Weitzenfeld et al.

(10) Patent No.: US 8,347,326 B2
(45) Date of Patent: Jan. 1, 2013

(54) IDENTIFYING KEY MEDIA EVENTS AND MODELING CAUSAL RELATIONSHIPS BETWEEN KEY EVENTS AND REPORTED FEELINGS

(75) Inventors: Daniel Weitzenfeld, East Windsor, NJ (US); Michael R. Fettiplace, Madison, WI (US); Hans C. Lee, Carmel, CA (US)

(73) Assignee: The Nielsen Company (US), Schaumburg, IL (US)

( * ) Notice: Subject to any disclaimer, the term of this patent is extended or adjusted under 35 U.S.C. 154(b) by 572 days.

(21) Appl. No.: 11/959,399

(22) Filed: Dec. 18, 2007

(65) Prior Publication Data

US 2009/0158308 A1     Jun. 18, 2009

(51) Int. Cl.
*H04H 60/56*     (2008.01)
*H04N 7/173*     (2006.01)
*G06Q 30/00*     (2012.01)

(52) U.S. Cl. ......... 725/24; 725/12; 705/7.29; 705/14.41
(58) Field of Classification Search .................... 725/24, 725/10, 12; 705/14.41, 14.44, 7.29
See application file for complete search history.

(56) References Cited

U.S. PATENT DOCUMENTS

| | | | |
|---|---|---|---|
| 3,950,618 A | 4/1976 | Bloisi | |
| 4,695,879 A | 9/1987 | Weinblatt | |
| 4,755,045 A | 7/1988 | Borah et al. | |
| 4,846,190 A | 7/1989 | John | |
| 4,931,934 A | 6/1990 | Snyder | |
| 4,974,602 A | 12/1990 | Abraham-Fuchs et al. | |
| 5,041,972 A | 8/1991 | Frost | |
| 5,077,785 A | 12/1991 | Monson | |
| 5,124,911 A | 6/1992 | Sack | |
| 5,243,517 A * | 9/1993 | Schmidt et al. | 600/544 |
| 5,301,109 A | 4/1994 | Landauer et al. | |
| 5,317,507 A | 5/1994 | Gallant | |
| 5,321,833 A | 6/1994 | Chang et al. | |
| 5,371,673 A | 12/1994 | Fan | |
| 5,406,957 A | 4/1995 | Tansey | |
| 5,447,166 A | 9/1995 | Gevins | |

(Continued)

FOREIGN PATENT DOCUMENTS

EP     1052582     11/2000

(Continued)

OTHER PUBLICATIONS

Form PCT/ISA/220, PCT/US07/15019, "PCT Notification of Transmittal of the International Search Report and the Written Opinion of the International Searching Authority, or the Declaration," 1 pg.

(Continued)

*Primary Examiner* — James R Sheleheda
(74) *Attorney, Agent, or Firm* — Hanley, Flight & Zimmerman, LLC

(57) ABSTRACT

A novel approach enables an event-based framework for evaluating a media instance based on key events of the media instance. First, physiological responses are derived and aggregated from the physiological data of viewers of the media instance. The key events in the media instance can then be identified, wherein such key events drive and determine the viewers' responses to the media instance. Causal relationship between the viewers' responses to the key events and their surveyed feelings about the media instance can further be established to identify why and what might have caused the viewers to feel the way they do.

24 Claims, 7 Drawing Sheets

U.S. PATENT DOCUMENTS

| | | |
|---|---|---|
| 5,450,855 A | 9/1995 | Rosenfeld |
| 5,495,412 A | 2/1996 | Thiessen |
| 5,519,608 A | 5/1996 | Kupiec |
| 5,537,618 A | 7/1996 | Boulton et al. |
| 5,579,774 A * | 12/1996 | Miller et al. ................. 600/480 |
| 5,601,090 A | 2/1997 | Musha |
| 5,659,732 A | 8/1997 | Kirsch |
| 5,659,742 A | 8/1997 | Beattie et al. |
| 5,668,953 A | 9/1997 | Sloo |
| 5,671,333 A | 9/1997 | Catlett et al. |
| 5,675,710 A | 10/1997 | Lewis |
| 5,676,138 A | 10/1997 | Zawilinski |
| 5,692,906 A | 12/1997 | Corder |
| 5,696,962 A | 12/1997 | Kupiec |
| 5,721,721 A | 2/1998 | Yanagisawa et al. |
| 5,724,987 A | 3/1998 | Givins et al. |
| 5,740,812 A | 4/1998 | Cowan |
| 5,761,383 A | 6/1998 | Engel |
| 5,774,591 A | 6/1998 | Black et al. |
| 5,794,412 A | 8/1998 | Ronconi |
| 5,819,285 A | 10/1998 | Damico et al. |
| 5,822,744 A | 10/1998 | Kesel |
| 5,836,771 A | 11/1998 | Ho et al. |
| 5,845,278 A | 12/1998 | Kirsch et al. |
| 5,857,179 A | 1/1999 | Vaithyanathan et al. |
| 5,884,302 A | 3/1999 | Ho |
| 5,895,450 A | 4/1999 | Sloo |
| 5,911,043 A | 6/1999 | Duffy et al. |
| 5,920,854 A | 7/1999 | Kirsch et al. |
| 5,924,094 A | 7/1999 | Sutter |
| 5,950,172 A | 9/1999 | Klingman |
| 5,950,189 A | 9/1999 | Cohen et al. |
| 5,953,718 A | 9/1999 | Wical |
| 5,974,412 A | 10/1999 | Hazlehurst et al. |
| 5,983,129 A | 11/1999 | Cowan et al. |
| 5,983,214 A | 11/1999 | Lang et al. |
| 5,983,216 A | 11/1999 | Kirsch et al. |
| 5,999,908 A | 12/1999 | Abelow |
| 6,006,221 A | 12/1999 | Liddy et al. |
| 6,012,053 A | 1/2000 | Pant et al. |
| 6,021,409 A | 2/2000 | Burrows |
| 6,026,387 A | 2/2000 | Kesel |
| 6,026,388 A | 2/2000 | Liddy et al. |
| 6,029,161 A | 2/2000 | Lang et al. |
| 6,029,195 A | 2/2000 | Herz |
| 6,032,145 A | 2/2000 | Beall et al. |
| 6,035,294 A | 3/2000 | Fish |
| 6,038,610 A | 3/2000 | Belfiore et al. |
| 6,064,980 A | 5/2000 | Jacobi et al. |
| 6,067,539 A | 5/2000 | Cohen |
| 6,078,892 A | 6/2000 | Anderson et al. |
| 6,094,657 A | 7/2000 | Hailpern et al. |
| 6,098,066 A | 8/2000 | Snow et al. |
| 6,099,319 A | 8/2000 | Zaltman et al. |
| 6,112,203 A | 8/2000 | Bharat et al. |
| 6,119,933 A | 9/2000 | Wong et al. |
| 6,138,113 A | 10/2000 | Dean et al. |
| 6,138,128 A | 10/2000 | Perkowitz et al. |
| 6,169,986 B1 | 1/2001 | Bowman et al. |
| 6,185,558 B1 | 2/2001 | Bowman et al. |
| 6,192,360 B1 | 2/2001 | Dumais et al. |
| 6,202,068 B1 | 3/2001 | Kraay et al. |
| 6,233,575 B1 | 5/2001 | Agrawal |
| 6,236,977 B1 | 5/2001 | Verba et al. |
| 6,236,987 B1 | 5/2001 | Horowitz et al. |
| 6,236,991 B1 | 5/2001 | Frauenhofer et al. |
| 6,254,536 B1 | 7/2001 | DeVito |
| 6,260,041 B1 | 7/2001 | Gonzalez |
| 6,266,664 B1 | 7/2001 | Russell-Falla et al. |
| 6,269,362 B1 | 7/2001 | Broder et al. |
| 6,278,990 B1 | 8/2001 | Horowitz |
| 6,289,342 B1 | 9/2001 | Lawrence et al. |
| 6,292,688 B1 * | 9/2001 | Patton ........................... 600/544 |
| 6,304,864 B1 | 10/2001 | Liddy et al. |
| 6,308,176 B1 | 10/2001 | Bagshaw |
| 6,309,342 B1 | 10/2001 | Blazey et al. |
| 6,314,420 B1 | 11/2001 | Lang et al. |
| 6,322,368 B1 | 11/2001 | Young et al. |
| 6,334,131 B2 | 12/2001 | Chakrabarti et al. |
| 6,360,215 B1 | 3/2002 | Judd et al. |
| 6,362,837 B1 | 3/2002 | Ginn |
| 6,366,908 B1 | 4/2002 | Chong et al. |
| 6,377,946 B1 | 4/2002 | Okamoto et al. |
| 6,385,586 B1 | 5/2002 | Dietz |
| 6,393,460 B1 | 5/2002 | Gruen et al. |
| 6,401,118 B1 | 6/2002 | Thomas |
| 6,411,936 B1 | 6/2002 | Sanders |
| 6,418,433 B1 | 7/2002 | Chakrabarti et al. |
| 6,421,675 B1 | 7/2002 | Ryan et al. |
| 6,434,549 B1 | 8/2002 | Linetsky et al. |
| 6,493,703 B1 | 12/2002 | Knight et al. |
| 6,507,866 B1 | 1/2003 | Barchi |
| 6,513,032 B1 | 1/2003 | Sutter |
| 6,519,631 B1 | 2/2003 | Rosenschein et al. |
| 6,526,440 B1 | 2/2003 | Bharat |
| 6,539,375 B2 | 3/2003 | Kawasaki |
| 6,546,390 B1 | 4/2003 | Pollack et al. |
| 6,553,358 B1 | 4/2003 | Horvitz |
| 6,571,234 B1 | 5/2003 | Knight et al. |
| 6,571,238 B1 | 5/2003 | Pollack et al. |
| 6,574,614 B1 | 6/2003 | Kesel |
| 6,584,470 B2 | 6/2003 | Veale |
| 6,585,521 B1 | 7/2003 | Obrador |
| 6,606,644 B1 | 8/2003 | Ford et al. |
| 6,622,140 B1 | 9/2003 | Kantrowitz |
| 6,623,428 B2 | 9/2003 | Miller et al. |
| 6,626,676 B2 | 9/2003 | Freer |
| 6,640,218 B1 | 10/2003 | Golding et al. |
| 6,651,056 B2 | 11/2003 | Price et al. |
| 6,651,086 B1 | 11/2003 | Manber et al. |
| 6,652,283 B1 | 11/2003 | Van Schaack et al. |
| 6,654,813 B1 | 11/2003 | Black et al. |
| 6,656,116 B2 | 12/2003 | Kim et al. |
| 6,658,389 B1 | 12/2003 | Alpdemir |
| 6,662,170 B1 | 12/2003 | Dom |
| 6,671,061 B1 | 12/2003 | Joffe et al. |
| 6,678,866 B1 | 1/2004 | Sugimoto et al. |
| 6,708,215 B1 | 3/2004 | Hingorani et al. |
| 6,721,734 B1 | 4/2004 | Subasic et al. |
| 6,751,606 B1 | 6/2004 | Fries et al. |
| 6,751,683 B1 | 6/2004 | Johnson et al. |
| 6,757,646 B2 | 6/2004 | Marchisio |
| 6,772,141 B1 | 8/2004 | Pratt et al. |
| 6,775,664 B2 | 8/2004 | Lang et al. |
| 6,778,975 B1 | 8/2004 | Anick et al. |
| 6,782,393 B1 | 8/2004 | Balabanovic et al. |
| 6,792,304 B1 | 9/2004 | Silberstein |
| 6,795,826 B2 | 9/2004 | Flinn et al. |
| 6,807,566 B1 | 10/2004 | Bates et al. |
| 6,839,682 B1 * | 1/2005 | Blume et al. ..................... 705/10 |
| 6,928,526 B1 | 8/2005 | Zhu et al. |
| 6,978,115 B2 | 12/2005 | Whitehurst et al. |
| 6,978,292 B1 | 12/2005 | Murakami et al. |
| 6,983,320 B1 | 1/2006 | Thomas |
| 6,999,914 B1 | 2/2006 | Boerner et al. |
| 7,035,685 B2 | 4/2006 | Ryu et al. |
| 7,043,760 B2 | 5/2006 | Holtzman et al. |
| 7,050,753 B2 | 5/2006 | Knutson |
| 7,113,916 B1 | 9/2006 | Hill |
| 7,146,416 B1 | 12/2006 | Yoo |
| 7,185,065 B1 | 2/2007 | Holtzman et al. |
| 7,188,078 B2 | 3/2007 | Arnett et al. |
| 7,188,079 B2 | 3/2007 | Arnett et al. |
| 7,197,470 B1 | 3/2007 | Arnett et al. |
| 7,277,919 B1 | 10/2007 | Donoho |
| D565,735 S | 4/2008 | Washbon |
| 7,363,243 B2 | 4/2008 | Arnett et al. |
| 7,523,085 B2 | 4/2009 | Nigam et al. |
| 7,596,552 B2 | 9/2009 | Levy et al. |
| 7,600,017 B2 | 10/2009 | Holtzman et al. |
| 7,660,783 B2 | 2/2010 | Reed |
| 7,725,414 B2 | 5/2010 | Nigam et al. |
| 7,844,483 B2 | 11/2010 | Arnett et al. |
| 7,844,484 B2 | 11/2010 | Arnett et al. |
| 7,877,345 B2 | 1/2011 | Nigam et al. |
| 8,041,669 B2 | 10/2011 | Nigam et al. |
| 2001/0016874 A1 | 8/2001 | Ono et al. |

| | | |
|---|---|---|
| 2001/0042087 A1 | 11/2001 | Kephart et al. |
| 2001/0056225 A1 | 12/2001 | DeVito |
| 2002/0010691 A1 | 1/2002 | Chen |
| 2002/0032772 A1 | 3/2002 | Olstad et al. |
| 2002/0059258 A1 | 5/2002 | Kirkpatrick |
| 2002/0062368 A1 | 5/2002 | Holtzman et al. |
| 2002/0087515 A1 | 7/2002 | Swannack |
| 2002/0123988 A1 | 9/2002 | Dean et al. |
| 2002/0133481 A1 | 9/2002 | Smith et al. |
| 2002/0154833 A1 | 10/2002 | Koch et al. |
| 2002/0159642 A1 | 10/2002 | Whitney |
| 2002/0182574 A1 | 12/2002 | Freer |
| 2003/0003433 A1 | 1/2003 | Carpenter et al. |
| 2003/0063780 A1 | 4/2003 | Gutta et al. |
| 2003/0070338 A1 | 4/2003 | Roshkoff |
| 2003/0076369 A1 | 4/2003 | Resner |
| 2003/0081834 A1 | 5/2003 | Philomin et al. |
| 2003/0088532 A1 | 5/2003 | Hampshire |
| 2003/0093784 A1* | 5/2003 | Dimitrova et al. ............... 725/10 |
| 2003/0126593 A1 | 7/2003 | Mault |
| 2003/0153841 A1 | 8/2003 | Kilborn et al. |
| 2004/0018476 A1 | 1/2004 | Ladue |
| 2004/0024752 A1 | 2/2004 | Manber et al. |
| 2004/0039268 A1 | 2/2004 | Barbour et al. |
| 2004/0054737 A1 | 3/2004 | Daniell |
| 2004/0059708 A1 | 3/2004 | Dean et al. |
| 2004/0059729 A1 | 3/2004 | Krupin et al. |
| 2004/0072133 A1 | 4/2004 | Kullock et al. |
| 2004/0078432 A1 | 4/2004 | Manber et al. |
| 2004/0111412 A1 | 6/2004 | Broder |
| 2004/0122811 A1 | 6/2004 | Page |
| 2004/0199498 A1 | 10/2004 | Kapur et al. |
| 2004/0205482 A1 | 10/2004 | Basu et al. |
| 2004/0208496 A1 | 10/2004 | Pilu |
| 2004/0210561 A1 | 10/2004 | Shen |
| 2004/0267141 A1 | 12/2004 | Amano et al. |
| 2005/0010087 A1 | 1/2005 | Banet |
| 2005/0039206 A1* | 2/2005 | Opdycke ........................ 725/35 |
| 2005/0043774 A1 | 2/2005 | Devlin et al. |
| 2005/0045189 A1 | 3/2005 | Jay |
| 2005/0049908 A2 | 3/2005 | Hawks |
| 2005/0066307 A1 | 3/2005 | Patel et al. |
| 2005/0071865 A1 | 3/2005 | Martins |
| 2005/0097594 A1 | 5/2005 | O'Donnell et al. |
| 2005/0113656 A1 | 5/2005 | Chance |
| 2005/0114161 A1 | 5/2005 | Garg |
| 2005/0125216 A1 | 6/2005 | Chitrapura et al. |
| 2005/0154686 A1 | 7/2005 | Corston et al. |
| 2005/0172311 A1 | 8/2005 | Hjelt et al. |
| 2005/0209907 A1 | 9/2005 | Williams |
| 2006/0004691 A1 | 1/2006 | Sifry |
| 2006/0041605 A1 | 2/2006 | King et al. |
| 2006/0069589 A1 | 3/2006 | Nigam et al. |
| 2006/0173819 A1 | 8/2006 | Watson |
| 2006/0173837 A1 | 8/2006 | Berstis et al. |
| 2006/0173985 A1 | 8/2006 | Moore |
| 2006/0206505 A1 | 9/2006 | Hyder et al. |
| 2006/0253316 A1 | 11/2006 | Blackshaw |
| 2006/0258926 A1 | 11/2006 | Ali et al. |
| 2006/0277102 A1 | 12/2006 | Agliozzo |
| 2006/0287989 A1 | 12/2006 | Glance |
| 2006/0293921 A1 | 12/2006 | McCarthy et al. |
| 2007/0027840 A1 | 2/2007 | Cowling et al. |
| 2007/0033189 A1 | 2/2007 | Levy et al. |
| 2007/0053513 A1 | 3/2007 | Hoffberg |
| 2007/0055169 A1 | 3/2007 | Lee et al. |
| 2007/0060830 A1 | 3/2007 | Le et al. |
| 2007/0060831 A1 | 3/2007 | Le et al. |
| 2007/0066914 A1 | 3/2007 | Le et al. |
| 2007/0100779 A1 | 5/2007 | Levy et al. |
| 2007/0116037 A1 | 5/2007 | Moore |
| 2007/0168461 A1 | 7/2007 | Moore |
| 2007/0173733 A1 | 7/2007 | Le et al. |
| 2007/0179396 A1 | 8/2007 | Le et al. |
| 2007/0184420 A1 | 8/2007 | Mathan et al. |
| 2007/0225585 A1 | 9/2007 | Washbon et al. |
| 2007/0235716 A1 | 10/2007 | Delic et al. |
| 2007/0238945 A1 | 10/2007 | Delic et al. |
| 2007/0265507 A1* | 11/2007 | de Lemos ........................ 600/300 |
| 2008/0091512 A1 | 4/2008 | Marci et al. |
| 2008/0144882 A1 | 6/2008 | Leinbach et al. |
| 2008/0159365 A1 | 7/2008 | Dubocanin et al. |
| 2008/0177197 A1 | 7/2008 | Lee et al. |
| 2008/0211768 A1 | 9/2008 | Breen et al. |
| 2008/0218472 A1 | 9/2008 | Breen et al. |
| 2009/0024049 A1 | 1/2009 | Pradeep et al. |
| 2009/0024447 A1 | 1/2009 | Pradeep et al. |
| 2009/0024448 A1 | 1/2009 | Pradeep et al. |
| 2009/0024449 A1 | 1/2009 | Pradeep et al. |
| 2009/0024475 A1 | 1/2009 | Pradeep et al. |
| 2009/0025023 A1 | 1/2009 | Pradeep et al. |
| 2009/0030287 A1 | 1/2009 | Pradeep et al. |
| 2009/0030303 A1 | 1/2009 | Pradeep et al. |
| 2009/0030717 A1 | 1/2009 | Pradeep et al. |
| 2009/0030930 A1 | 1/2009 | Pradeep et al. |
| 2009/0036755 A1 | 2/2009 | Pradeep et al. |
| 2009/0036756 A1 | 2/2009 | Pradeep et al. |
| 2009/0062629 A1 | 3/2009 | Pradeep et al. |
| 2009/0062681 A1 | 3/2009 | Pradeep et al. |
| 2009/0063255 A1 | 3/2009 | Pradeep et al. |
| 2009/0063256 A1 | 3/2009 | Pradeep et al. |
| 2009/0082643 A1 | 3/2009 | Pradeep et al. |
| 2009/0083129 A1 | 3/2009 | Pradeep et al. |
| 2009/0105576 A1 | 4/2009 | Do et al. |
| 2009/0112077 A1 | 4/2009 | Nguyen et al. |
| 2009/0156925 A1 | 6/2009 | Jin et al. |
| 2009/0214060 A1 | 8/2009 | Chuang et al. |
| 2009/0222330 A1 | 9/2009 | Leinbach |
| 2011/0161270 A1 | 6/2011 | Arnett et al. |

FOREIGN PATENT DOCUMENTS

| | | |
|---|---|---|
| KR | 10-2000-0072489 | 12/2000 |
| KR | 10-2001-0104579 | 11/2001 |
| WO | 00/17824 | 3/2000 |
| WO | 00/17827 | 3/2000 |
| WO | 01/97070 | 12/2001 |

OTHER PUBLICATIONS

Form PCT/ISA/210, PCT/US07/15019, "PCT International Search Report," 2 pgs.
Form PCT/ISA/237, PCT/US07/15019, "PCT Written Opinion of the International Searching Authority," 5 pgs.
Form PCT/IB/326, PCT/US07/015019, "Notification Concerning Transmittal of International Preliminary Report on Patentability."
Form PCT/IB/373, PCT/US07/15019, "International Preliminary Report on Patentability."
Form PCT/ISA/220, PCT/US07/14955, "PCT Notification of Transmittal of the International Search Report and the Written Opinion of the International Searching Authority, or the Declaration," 1 pg.
Form PCT/ISA/210, PCT/US07/14955, "PCT International Search Report," 2 pgs.
Form PCT/ISA/237, PCT/US07/14955, "PCT Written Opinion of the International Searching Authority," 6 pgs.
Form PCT/IB/326, PCT/US07/14955, "Notification Concerning Transmittal of International Preliminary Report on Patentability." 1 page.
Form PCT/IB/373, PCT/US07/14955, "International Preliminary Report on Patentability." 1 page.
Form PCT/ISA/220, PCT/US07/16796, "PCT Notification of Transmittal of the International Search Report and the Written Opinion of the International Searching Authority, or the Declaration," 1 pg.
Form PCT/ISA/210, PCT/US07/16796, "PCT International Search Report," 2 pgs.
Form PCT/ISA/237, PCT/US07/16796, "PCT Written Opinion of the International Searching Authority," 6 pgs.
Form PCT/IB/326, PCT/US07/16796, "Notification Concerning Transmittal of International Preliminary Report on Patentability." 1 page.
Form PCT/IB/373, PCT/US07/16796, "International Preliminary Report on Patentability." 1 page.
Form PCT/ISA/220, PCT/US06/31569, "PCT Notification of Transmittal of the International Search Report and the Written Opinion of the International Searching Authority, or the Declaration," 1 pg.

Form PCT/ISA/210, PCT/US06/31569, "PCT International Search Report," 3 pgs.
Form PCT/ISA/237, PCT/US06/31569, "PCT Written Opinion of the International Searching Authority," 6 pgs.
Form PCT/IB/326, PCT/US06/31569, "Notification Concerning Transmittal of International Preliminary Report on Patentability." 1 page.
Form PCT/IB/373, PCT/US06/31569, "International Preliminary Report on Patentability." 1 page.
Form PCT/ISA/220, PCT/US07/20714, "PCT Notification of Transmittal of the International Search Report and the Written Opinion of the International Searching Authority, or the Declaration," 1 pg.
Form PCT/ISA/210, PCT/US07/20714, "PCT International Search Report," 2 pgs.
Form PCT/ISA/237, PCT/US07/20714, "PCT Written Opinion of the International Searching Authority," 6 pgs.
Form PCT/IB/326, PCT/US07/20714, "Notification Concerning Transmittal of International Preliminary Report on Patentability." 1 page.
Form PCT/IB/373, PCT/US07/20714, "International Preliminary Report on Patentability." 1 page.
Form PCT/ISA/220, PCT/US07/17764, "PCT Notification of Transmittal of the International Search Report and the Written Opinion of the International Searching Authority, or the Declaration," 1 pg.
Form PCT/ISA/210, PCT/US07/17764, "PCT International Search Report," 2 pgs.
Form PCT/ISA/237, PCT/US07/17764, "PCT Written Opinion of the International Searching Authority," 7 pgs.
Form PCT/IB/326, PCT/US07/17764, "Notification Concerning Transmittal of International Preliminary Report on Patentability." 1 page.
Form PCT/IB/373, PCT/US07/17764, "International Preliminary Report on Patentability." 1 page.
Form PCT/ISA/220, PCT/US07/20713, "PCT Notification of Transmittal of the International Search Report and the Written Opinion of the International Searching Authority, or the Declaration," 1 pg.
Form PCT/ISA/210, PCT/US07/20713, "PCT International Search Report," 2 pgs.
Form PCT/ISA/237, PCT/US07/20713, "PCT Written Opinion of the International Searching Authority," 5 pgs.
Form PCT/IB/326, PCT/US07/20713, "Notification Concerning Transmittal of International Preliminary Report on Patentability." 1 page.
Form PCT/IB/373, PCT/US07/20713, "International Preliminary Report on Patentability." 1 page.
Form PCT/ISA/220, PCT/US08/09110, "PCT Notification of Transmittal of the International Search Report and the Written Opinion of the International Searching Authority, or the Declaration," 1 pg.
Form PCT/ISA/210, PCT/US08/09110, "PCT International Search Report," 3 pgs.
Form PCT/ISA/237, PCT/US08/09110, "PCT Written Opinion of the International Searching Authority," 4 pgs.
Form PCT/ISA/220, PCT/US08/75640, "PCT Notification of Transmittal of the International Search Report and the Written Opinion of the International Searching Authority, or the Declaration," 1 pg.
Form PCT/ISA/210, PCT/US08/75640, "PCT International Search Report," 2 pgs.
Form PCT/ISA/237, PCT/US08/75640, "PCT Written Opinion of the International Searching Authority," 3 pgs.
Form PCT/ISA/220, PCT/US08/78633, "PCT Notification of Transmittal of the International Search Report and the Written Opinion of the International Searching Authority, or the Declaration," 1 pg.
Form PCT/ISA/210, PCT/US08/78633, "PCT International Search Report," 2 pgs.
Form PCT/ISA/237, PCT/US08/78633, "PCT Written Opinion of the International Searching Authority," 6 pgs.
Form PCT/ISA/220, PCT/US08/82147, "PCT Notification of Transmittal of the International Search Report and the Written Opinion of the International Searching Authority, or the Declaration," 1 pg.
Form PCT/ISA/210, PCT/US08/82147, "PCT International Search Report," 2 pgs.
Form PCT/ISA/237, PCT/US08/82147, "PCT Written Opinion of the International Searching Authority," 13 pgs.
Form PCT/ISA/220, PCT/US08/82149, "PCT Notification of Transmittal of the International Search Report and the Written Opinion of the International Searching Authority, or the Declaration," 1 pg.
Form PCT/ISA/210, PCT/US08/82149, "PCT International Search Report," 2 pgs.
Form PCT/ISA/237, PCT/US08/82149, "PCT Written Opinion of the International Searching Authority," 14 pgs.
Form PCT/ISA/220, PCT/US08/75651, "PCT Notification of Transmittal of the International Search Report and the Written Opinion of the International Searching Authority, or the Declaration," 1 pg.
Form PCT/ISA/210, PCT/US08/75651, "PCT International Search Report," 2 pgs.
Form PCT/ISA/237, PCT/US08/75651, "PCT Written Opinion of the International Searching Authority," 9 pgs.
Form PCT/ISA/220, PCT/US08/85723, "PCT Notification of Transmittal of the International Search Report and the Written Opinion of the International Searching Authority, or the Declaration," 1 pg.
Form PCT/ISA/210, PCT/US08/85723, "PCT International Search Report," 2 pgs.
Form PCT/ISA/237, PCT/US08/85723, "PCT Written Opinion of the International Searching Authority," 7 pgs.
Form PCT/ISA/220, PCT/US08/85203, "PCT Notification of Transmittal of the International Search Report and the Written Opinion of the International Searching Authority, or the Declaration," 1 pg.
Form PCT/ISA/210, PCT/US08/85203, "PCT International Search Report," 2 pgs.
Form PCT/ISA/237, PCT/US08/85203, "PCT Written Opinion of the International Searching Authority," 6 pgs.
Form PCT/ISA/220, PCT/US08/75649, "PCT Notification of Transmittal of the International Search Report and the Written Opinion of the International Searching Authority, or the Declaration," 1 pg.
Form PCT/ISA/210, PCT/US08/75649, "PCT International Search Report," 3 pgs.
Form PCT/ISA/237, PCT/US08/75649, "PCT Written Opinion of the International Searching Authority," 5 pgs.
Technology Platform: SmartShirt + Eye-Tracking Innerscope Research, Mar. 2007.
Egner, Tobias; Emilie Strawson, and John H. Gruzelier, "EEG Signature and Phenomenology of Alpha/theta Neurofeedback Training Versus Mock Feedback." Applied Psychophysiology and Biofeedback. vol. 27, No. 4. Dec. 2002.
Clarke, Adam R. et al., EEG Analysis of Children with Attention-Deficit/Hyperactivity Disorder and Comorbid Reading Disabilities, Journal of Learning Disabilities, vol. 35, No. 3, (May-Jun. 2002), pp. 276-285.
Carter, R., "Mapping the Mind" 1998 p. 182 University of California Press, Berkley.
Harmony et al. (2004) Specific EEG frequencies signal general common cognitive processes as well as specific tasks processes in man. Int. Journal of Psychophysiology 53(3): 207-16.
Klimesch, W., Schimke, H., Schwaiger, J. (1994) Episodic and semantic memory: an analysis in the EEG theta and alpha band. Electroencephalography Clinical Neurophysiology.
Mizuhara, H.,Wang LQ, Kobayashi, K.,Yamaguchi,Y., (2004) a long range cortical network emerging with theta oscillation in mental task. Neuroreport 15(8): 1233-1238.
Selden, G (1981) "Machines that Read Minds." Science Digest, October.
Willis, M. & Hodson, V.; Discover Your Child's Learning Style: Children Learn in Unique Ways—Here's the Key to Every Child's Learning Success, Prime Publishing. Roseville, CA.
Wise, A (1996) The High Performance Mind, Mastering Brainwaves for Insight, Healing and Creativity. G.P. Putnam's Son, New York. pp. 13-15; 20-22; 143-156.
Wise, A (1996) The High Performance Mind, Mastering Brainwaves for Insight, Healing and Creativity. G.P. Putnam's Son, New York. pp. 156-158; 165-170; 186-187, 189-192.
El-Bab, M. (2001) Cognitive event related potentials during a learning task. Doctoral Dissertation, Faculty of Medicine, University of Southampton, UK.
Gevins et al. (1997) High resolution EEG mapping of cortical activation related to a working memory, Cereb Cortex. 7: 374-385.

Hughes, J.R. & John, E.R. (1999) Conventional and Quantitative Electroencephalography in Psychiatry. Journal of Neuropsychiatry and Clinical Neurosciences. vol. 11(2): 190-208.

Adamic et al., "The political blogosphere and the 2004 U.S. election: Divided they blog," Proceedings WWW-2005 2nd Annual Workshop on the Weblogging Ecosystem, 2005, Chiba, Japan (16 pages).

Adar et al., "Implicit structure and dynamics of blogspace," Proceedings WWW-2004 Workshop on the Weblogging Ecosystem, 2004, New York, NY (8 pages).

Aliod et al., "A Real World Implementation of Answer Extraction," Department of Computer Science, University of Zurich, Winterthurerstr. 190, CH-8057 Zurich, Switzerland (6 pages).

Bishop, Mike, "ARROW Question/Answering Systems," Language Computer Corporation, 1999 (3 pages).

Bizrate, archived version of www.bizrate.com, Jan. 1999 (22 pages).

Blum, "Empirical Support for Winnow and Weighted-Majority Algorithms: Results on a Calendar Scheduling Domain," in Machine Learning, vol. 26, Kluwer Academic Publishers, Boston, USA, 1997 (19 pages).

Bournellis, Cynthia, "Tracking the hits on Web Sites," Communications International: vol. 22, Issue 9, London, Sep. 1995 (3 pages).

Chaum et al., "A Secure and Privacy-Protecting Protocol for Transmitting Personal Information Between Organizations," A.M. Odlyzko (Ed.): Advances in Cryptology, CRYPTO '86, LNCS 263, 1987 (53 pages).

Chaum, David L., "Untraceable Electronic Mail, Return Addresses, and Digital Pseudonymns," Communication of the ACM, vol. 24, No. 2, 1981 (5 pages).

Cohen, William W., "Data Integration using similarity joins and a word-based information representation language," ACM Transactions on Information Systems, vol. 18, No. 3, Jul. 2000, (34 pages).

Cohn et al., "Active Learning with Statistical Models," Journal of Artificial Intelligence Research 4, A1 Access Foundation and Morgan Kaufmann Publishers, USA, 1996 (17 pages).

Dagan et al, "Mistake-Driven Learning in Text Categorization," in EMNLP '97, $2^{nd}$ Conference on Empirical Methods in Natural Language Processing, 1997 (9 pages).

Delahaye Group, "Delahaye Group to Offer Net Bench: High Level Web-Site Qualitative Analysis and Reporting; Netbench Builds on Systems provided by I/PRO and Internet Media Services," 1995 Business Wire, Inc., May 31, 1995, (3 pages).

Dialogic, www.dialogic.com as archived on May 12, 2000, (34 pages).

Dillon et al., "Marketing research in a Marketing Environment," Times Mirror/Mosby College, USA, 1987 (5 pages).

Ewatch, eWatch's archived web site retrieved from [URL: http://web.archive.org/web/19980522190526/wwww.ewatch.com] on Sep. 8, 2004, archived May 22, 1998 (50 pages).

Farber, Dave, "IP: eWatch and Cybersleuth," retrieved from [URL: http://www.interesting-people.org/archives/interesting-people/200006/msg00090.html] Jun. 29, 2000 (4 pages).

Freund et al., "Selective Sampling Using the Query by Committee Algorithm," Machine Learning 28 Kluwer Academic Publishers, The Netherlands, 1997 (36 pages).

Glance et al., "Analyzing online disussion for marketing intelligence," Proceedings WWW-2005 2nd Annual Workshop on the Weblogging Ecosystem, Chiba, Japan, 2005 (2 pages).

Glance et al., "Deriving marketing intelligence from online discussion," 11th ACM SIGKDD International Conference on Knowledge Discovery and Data Mining, Chicago, IL, Aug 21-24, 2005 (10 pages).

Grefenstette et al., "Validating the Coverage of Lexical Resources for Affect Analysis and Automatically Classifying New Words along Semantic Axes," Chapter X, Mar. 2004 (16 pages).

Harabagiu, Sanda M., "An Intelligent System for Question Answering," University of Southern California; Modlovan, Dan, Southern Methodist University, 1996 (5 pages).

Harabagiu, Sanda M., "Experiments with Open-Domain Textual Question Asnwering," Department of Computer Science and Engineering at Southern Methodist Universtity, 2000 (7 pages).

Harabagiu, Sanda M., "Mining Textual Answers with Knowledge-Based Indicators," Department of Computer Science and Engineering at Southern Methodist University, 2000 (4 pages).

Housley et al., "Internet X.509 Public Key Infrastructure Certificate and CRL Profile," Network Working Group Request for Comments: 2459, Jan. 1999 (121 pages).

Joachims, Thorsten, "Text Categorization with Support Vector Machines: Learning with Many Relevant Features," in Machine Learning: ECML-98, Tenth European Conference on Machine Learning, 1998 (7 pages).

Kahn et al., "Categorizing Web Documents using Competitive Learning; An ingrediant of a Personal Adaptive Agent," IEEE 1997 (4 pages).

Katz, Boris, "From Sentence Processing to Information Access on the World Wide Web: Start Information Server," MIT Artificial Intelligence Laboratory, Feb. 27, 1997 (20 pages).

Kleppner, "Advertising Procedure," 6th edition, 1977, Prentice-Hall, Inc., Englewood Cliffs, NJ, p. 492 (3 pages).

Kotler, "Marketing Management," PrenticeHall International Inc., Upper Saddle River, NJ, 1997 (10 pages).

Lenz et al., "Question answering with Textual CBR," Department of Computer Science, Humboldt University Berlin, D-10099 Berlin, 1998 (12 pages).

Littlestone, Nick, "Learning Quickly When Irrelevant Attributes Abound: A New Linear-threshold Algorithm," in Machine Learning, vol. 2, Kluwer Academic Publishers, Boston, MA, 1988 (34 pages).

Marlow, "Audience, structure and authority in the weblog community," International Communication Association Conference, MIT Media Laboratory, New Orleans, LA 2004 (9 pages).

McCallum et al., "Text Classification by Bootstrapping with the Keywords, EM and Shrinkage," Just Research and Carnegie Mellon University, Pittsburgh, PA, circa 1999 (7 pages).

McLachlan et al., "The EM Algorithm and Extensions," John Wiley & Sons, Inc., New York, NY, 1997 (301 pages).

Moldovan et al., "LASSO: A Tool for Surfing the Answer Net," Department of Computer Science and Engineering at Southern Methodist University, 1999 (9 pages).

Nakashima et al., "Information Filtering for the Newspaper," IEEE 1997 (4 pages).

Nanno et al., "Automatic collection and monitoring of Japanese Weblogs," Proceedings WWW-2004 Workshop on the weblogging Ecosystem, 2004, New York, NY (7 pages).

Netcurrent, NetCurrent's web site, http://web.archive.org/web/20000622024845/www.netcurrents.com, retrieved on Jan. 17, 2005, archived on Jun. 22, 2000 and Sep. 18, 2000 (17 pages).

Pang et al., "Thumbs up? Sentiment Classification using Machine Learning Techniques," in Proceedings of EMNLP 2002 (8 pages).

Reguly, "Caveat Emptor Rules on the Internet," The Globe and Mail (Canada): Report on Business Column, Apr. 10, 1999 (2 pages).

Reinartz, "Customer Lifetime Value Analysis: An Integrated Empirical Framework for Measurement and Explanation," dissertation: Apr. 1999 (68 pages).

Soderland et al., "Customer Satisfaction and Links to Customer Profitability: An Empirical Examination of the Association Between Attitudes and Behavior," SSE/EFI Working Paper Series in Business Administration, Jan. 1999 (22 pages).

Thomas, "International Marketing," International Textbook Company, Scranton, PA 1971 (3 pages).

Trigaux, Robert, "Cyberwar Erupts Over Free Speech Across Florida, Nation," Knight-Ridder Tribune Business News, May 29, 2000 (4 pages).

Tull et al., "Marketing Research Measurement and Method," MacMillan Publishing Company, New York, NY, 1984 (9 pages).

Voorhees, Ellen M., "The TREC-8 Question Answering Track Report," National Institute of Standards and Technology, 1999 (6 pages).

Wiebe et al., "Identifying Collocations for Recognizing Opinions," in proceedings of ACL/EACL '01 Workshop on Collocation, Toulouse, France, Jul. 2001 (9 pages).

Word of Mouth Research Case Study, "The Trans Fat Issue, Analysis of online consumer conversation to understand how the Oreo lawsuit impacted word-of-mouth on trans fats," Aug. 16, 2004 (35 pages).

Yang, "An Evaluation of Statistical Approaches to Text Categorization," Information Retrieval 1 (1/2) Apr. 10, 1999 (12 pages).

Zagat, www.zagat.com, archived on Apr. 29, 1999 (33 pages).

Zagat, www.zagat.com, archived version of p. 34, Feb. 1999 (1 page).

* cited by examiner

```
stepwise, pr(.2) lr: ologit  How_did_this_commercial_affect
DANSLIFT_1satlft DANSLIFT_2satlft  AVGLVL_6satlvl AVGLVL_8satlvl
AVGLVL_10satlvl T_DANSLIFT_12thtlft T_DANSLIFT_13thtlft T_DANSLIFT_14thtlft LR test                begin with full model
p = 0.9254 >= 0.2000   removing T_DANSLIFT_14thtlft
p = 0.7661 >= 0.2000   removing AVGLVL_8satlvl
p = 0.3630 >= 0.2000   removing T_DANSLIFT_13thtlft
p = 0.2715 >= 0.2000   removing T_DANSLIFT_12thtlft
p = 0.2206 >= 0.2000   removing DANSLIFT_1satlft
p = 0.2318 >= 0.2000   removing AVGLVL_6satlvl Ordered logistic regression                    Number of obs    =         81
                                               LR chi2(2)       =       7.99
                                               Prob > chi2      =     0.0184
Log likelihood = -82.352015                    Pseudo R2        =     0.0463

---------------------------------------------------------------------------
How_did_th~t |    Coef.   Std. Err.      z    P>|z|    [95% Conf. Interval]
-------------+-------------------------------------------------------------
AVGLVL_10s~l | -.5784227  .2456446   -2.35   0.019   -1.059877   -.0969681
DANSLIFT_2~t | -.3953673  .2649392   -1.49   0.136    -.9146386   .1239041
-------------+-------------------------------------------------------------
       /cut1 | -4.713846  1.018922                   -6.710897  -2.716795
       /cut2 | -3.027172   .485874                   -3.979467  -2.074876
       /cut3 |   .357021  .2413743                   -.1160639    .830106
       /cut4 |  2.736364  .4700064                    1.815169    3.65756
---------------------------------------------------------------------------
```

Figure 5

IDENTIFYING KEY MEDIA EVENTS AND MODELING CAUSAL RELATIONSHIPS BETWEEN KEY EVENTS AND REPORTED FEELINGS

BACKGROUND

Advertisers, media producers, educators and other relevant parties have long desired to understand the responses their targets—customers, clients and pupils—have to their particular stimulus in order to tailor their information or media instances to better suit the needs of these targets and/or to increase the effectiveness of the media instance created. A key to making a high performing media instance is to make sure that every event in the media instance elicits the desired responses from the viewers, not responses very different from what the creator of the media instance expected. The media instance herein can be but is not limited to, a video, an advertisement clip, a movie, a computer application, a printed media (e.g., a magazine), a video game, a website, an online advertisement, a recorded video, a live performance, a debate, and other types of media instance from which a viewer can learn information or be emotionally impacted.

It is well established that physiological response is a valid measurement for viewers' changes in emotions and an effective media instance that connects with its audience/viewers is able to elicit the desired physiological responses from the viewers. Every media instance may have its key events/moments—moments which, if they do not evoke the intended physiological responses from the viewers, the effectiveness of the media instance may suffer significantly. For a non-limiting example, if an ad is intended to engage the viewers by making them laugh, but the viewers do not find a 2-second-long punch-line funny, such negative responses to this small piece of the ad may drive the overall reaction to the ad. Although survey questions such as "do you like this ad or not" have long been used to gather viewers' subjective reactions to a media instance, they are unable to provide more insight into why and what have caused the viewers reacted in the way they did.

SUMMARY

An approach enables an event-based framework for evaluating a media instance based on key events of the media instance. First, physiological responses are derived and aggregated from the physiological data of viewers of the media instance. The key events in the media instance can then be identified, wherein such key events drive and determine the viewers' responses to the media instance. Causal relationship between the viewers' responses to the key events and their surveyed feelings about the media instance can further be established to identify why and what might have caused the viewers to feel the way they do.

Such an approach provides information that can be leveraged by a creator of the media instance to improve the media instance. For a non-limiting example, if a joke in an advertisement is found to drive purchase intent of the product advertised, but the advertisement's target demographic does not respond to the joke, the joke can be changed so that the advertisement achieves its goal: increasing product purchase intent in the target demographic.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. These and other advantages of the present invention will become apparent to those skilled in the art upon a reading of the following descriptions and a study of the several figures of the drawings.

BRIEF DESCRIPTION OF THE DRAWINGS

FIG. 5 depicts results from exemplary multivariate regression runs on events in an advertisement to determine which events drive the viewers' responses the most.

DETAILED DESCRIPTION

Figure 1:
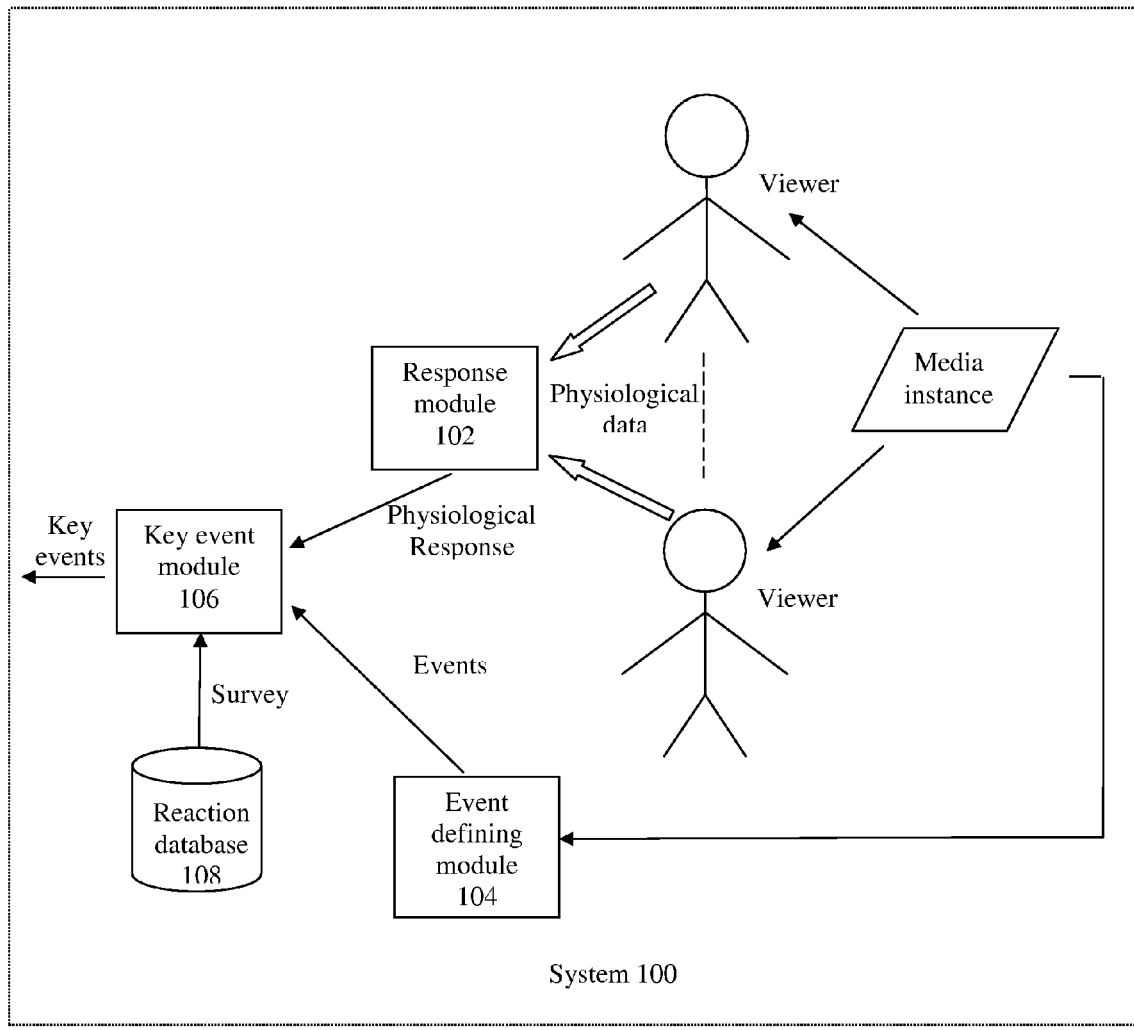
FIG. 1 depicts an example of a system to support identification of key events in a media instance that drive physiological responses from viewers.

The invention is illustrated by way of example and not by way of limitation in the figures of the accompanying drawings in which like references indicate similar elements. It should be noted that references to "an" or "one" or "some" embodiment(s) in this disclosure are not necessarily to the same embodiment, and such references mean at least one. Although the subject matter is described in language specific to structural features and/or methodological acts, it is to be understood that the subject matter defined in the appended claims is not necessarily limited to the specific features or acts described above. Rather, the specific features and acts described above are disclosed as example forms of implementing the claims.

Although the diagrams depict components as functionally separate, such depiction is merely for illustrative purposes. It will be apparent to those skilled in the art that the components portrayed in this figure can be arbitrarily combined or divided into separate software, firmware and/or hardware components. Furthermore, it will also be apparent to those skilled in the art that such components, regardless of how they are combined or divided, can execute on the same computing device or multiple computing devices, and wherein the multiple computing devices can be connected by one or more networks.

Physiological data, which includes but is not limited to heart rate, brain waves, electroencephalogram (EEG) signals, blink rate, breathing, motion, muscle movement, galvanic skin response and any other response correlated with changes in emotion of a viewer of a media instance, can give a trace (e.g., a line drawn by a recording instrument) of the viewer's responses while he/she is watching the media instance. The physiological data can be measure by one or more physiological sensors, each of which can be but is not limited to, an electroencephalogram, an accelerometer, a blood oxygen sensor, a galvanometer, an electromyograph, skin temperature sensor, breathing sensor, and any other physiological sensor.

The physiological data in the human body of a viewer has been shown to correlate with the viewer's change in emotions. Thus, from the measured "low level" physiological data, "high level" (i.e., easier to understand, intuitive to look at) physiological responses from the viewers of the media instance can be created. An effective media instance that connects with its audience/viewers is able to elicit the desired emotional response. Here, the high level physiological responses include, but are not limited to, liking (valence)—positive/negative responses to events in the media instance, intent to purchase or recall, emotional engagement in the media instance, thinking—amount of thoughts and/or immersion in the experience of the media instance, adrenaline—anger, distraction, frustration, and other emotional experiences to events in the media instance. In addition, the physiological responses may also include responses to other types of sensory stimulations, such as taste and/or smell, if the subject matter is food or a scented product instead of a media instance.

FIG. 1 depicts an example of a system 100 to support identification of key events in a media instance that drives physiological responses from viewers. In the example of FIG. 1, the system 100 includes a response module 102, an event defining module 104, a key event module 106, and a reaction database 108.

The response module 102 is a software component which while in operation, first accepts and/or records physiological data from each of a plurality of viewers watching a media instance, then derives and aggregates physiological responses from the collected physiological data. Such derivation can be accomplished via a plurality of statistical measures, which include but are not limited to, average value, deviation from mean, 1st order derivative of the average value, 2nd order derivative of the average value, coherence, positive response, negative response, etc., using the physiological data of the viewers as inputs. Facial expression recognition, "knob" and other measures of emotion can also be used as inputs with comparable validity. Here, the physiological data may be either be retrieved from a storage device or measured via one or more physiological sensors, each of which can be but is not limited to, an electroencephalogram, an accelerometer, a blood oxygen sensor, a galvanometer, an electromygraph, and any other physiological sensor either in separate or integrated form. The derived physiological responses can then be aggregated over the plurality of viewers watching one or more media instances.

The event defining module 104 is a software component which while in operation, defines and marks occurrences and durations of a plurality of events happening in the media instance. The duration of each of event in the media instance can be constant, non-linear, or semi-linear in time. Such event definition may happen either before or after the physiological data of the plurality of viewers has been measured, where in the later case, the media instance can be defined into the plurality of events based on the physiological data measured from the plurality of viewers.

The key event module 106 is a software component which while in operation, identifies one or more key events in the media instance and reports the key events to an interested party of the media instance, wherein the key events drive and determine the viewers' physiological responses to the media instance. Key events in the media instance can be used to pinpoint whether and/or which part of the media instance need to be improved or changed, and which part of the media instance should be kept intact. For non-limiting examples, the key event module may identify which key event(s) in the media instance trigger the most positive or negative responses from the viewers, or alternatively, which key event(s) are polarizing events, e.g., they cause large discrepancies in the physiological responses from different demographic groups of viewers, such as between groups of men and women, when the groups are defined by demographic characteristics. In addition, the key event module is operable to establish a causal relationship between the viewers' responses to the events in the media instance and their surveyed feelings about the media instance so that creator of the media instance may gain insight into the reason why and what key events might have caused the viewers to feel the way they do.

The reaction database 108 stores pertinent data of the media instance the viewers are watching, wherein the pertinent data includes but is not limited to survey questions and results asked for each of the plurality of viewers before, during, and/or after their viewing of the media instance. In addition, the pertinent data may also include but is not limited to the following:

Events/moments break down of the media instance;
Key events in the media instance;
Metadata of the media instance, which can include but is not limited to, production company, brand, product name, category (for non-limiting examples, alcoholic beverages, automobiles, etc), year produced, target demographic (for non-limiting examples, age, gender, income, etc) of the media instance.
If the subject matter is food or a scented product instead of a media instance, the surveyed reactions to the taste or smell of a key ingredient in the food or scented product.

Here, the term database is used broadly to include any known or convenient means for storing data, whether centralized or distributed, relational or otherwise.

While the system 100 depicted in FIG. 1 is in operation, the response module 102 derives aggregated physiological responses from the physiological data of a plurality of viewers watching a media instance. The key event module 106 identifies, among the plurality of events in the media instance as defined by the event defining module 104, one or more key events that drive and determine the viewers' physiological responses to the media instance based on the aggregated physiological responses from the viewers. In addition, the key event module 106 may retrieve outcomes to questions surveyed from the viewers of the media instance from the reaction database 108, and correlates the viewers' responses to the key events and their surveyed feelings about the media instance to determine what might have caused the viewers to feel the way they do. The entire approach can also be automated as each step of the approach can be processed by a computing device, allowing for objective measure of a media without much human input or intervention.

Figure 2:
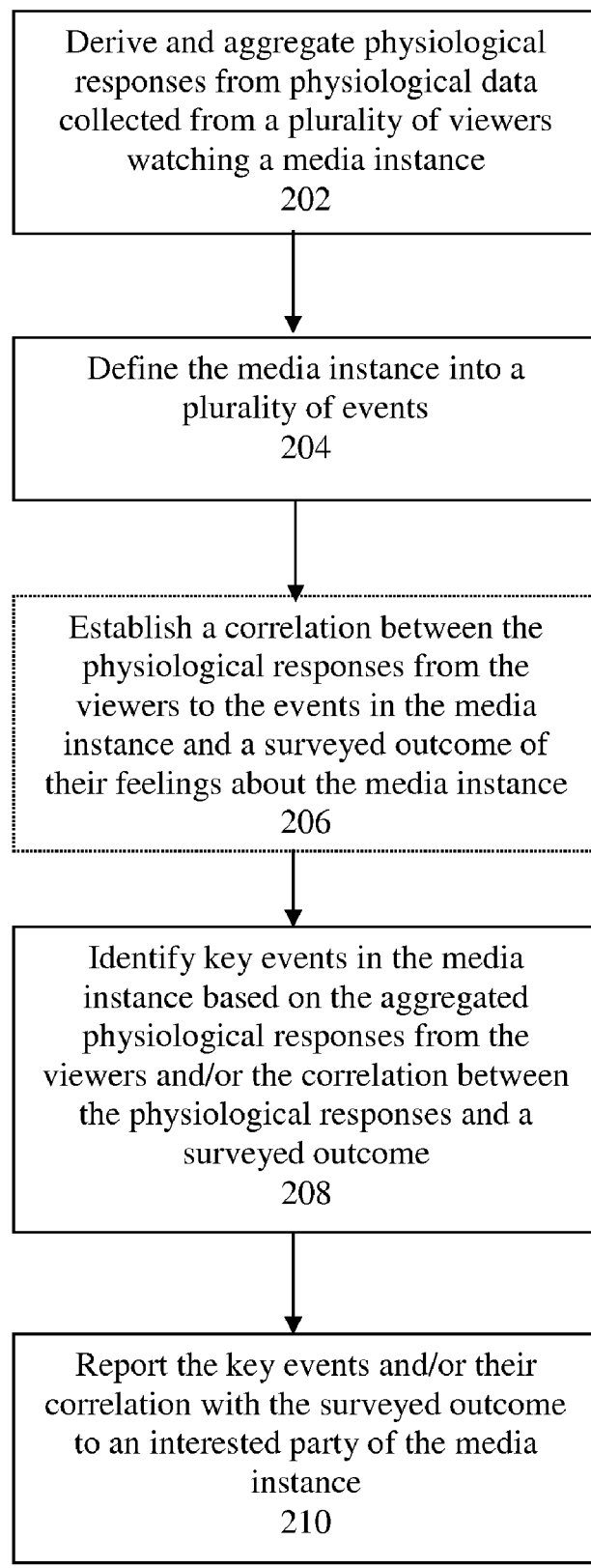
FIG. 2 depicts a flowchart of an exemplary process to support identification of key events in a media instance that drive physiological responses from viewers.

FIG. 2 depicts a flowchart of an exemplary process to support identification of key events in a media instance that drive physiological responses from viewers. Although this figure depicts functional steps in a particular order for purposes of illustration, the process is not limited to any particular order or arrangement of steps. One skilled in the art will appreciate that the various steps portrayed in this figure could be omitted, rearranged, combined and/or adapted in various ways.

Referring to FIG. 2, physiological responses can be derived and aggregated from the physiological data of a plurality of viewers watching a media instance at block 202. At block 204, the media instance can be defined into a plurality of events, and correlation between the physiological responses from the viewers to the key events in the media instance and a surveyed outcome of their feelings about the media instance can optionally be established at block 206. At block 208, key events in the media instance can be identified based on the aggregated physiological responses from the viewers and/or the correlation between the physiological responses and a surveyed outcome. Finally, the key events and/or their correlation with the surveyed outcome are reported to an interested party of the media instance at block 210, wherein the interested party may then improve the media instance based on the key events and/or the correlations.

Events Definition

In some embodiments, the event defining module 104 is operable to define occurrence and duration of events in the media instance based on salient positions identified in the media instance. Once salient positions in the media instance are identified, the events corresponding to the salient positions can be extracted. For a non-limiting example, an event in a video game may be defined as a "battle tank" appearing in the player's screen and lasting as long as it remains on the screen. For another non-limiting example, an event in a movie may be defined as occurring every time a joke is made. While defining humor is difficult, punch line events that are unexpected, absurd, and comically exaggerated often qualify as joke events.

Figure 3:
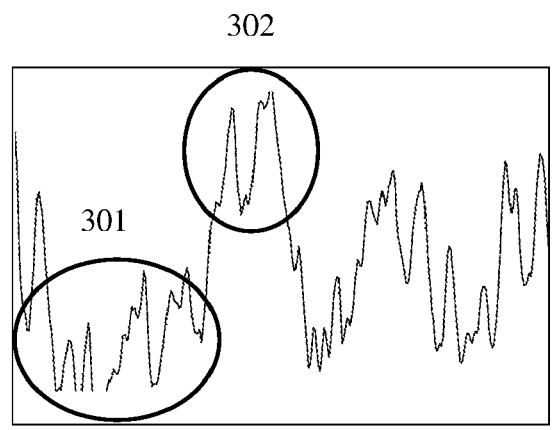
FIGS. 3(a)-(c) depict exemplary traces of physiological responses measured and exemplary dividing lines of events in a media instance.
Figure 3:
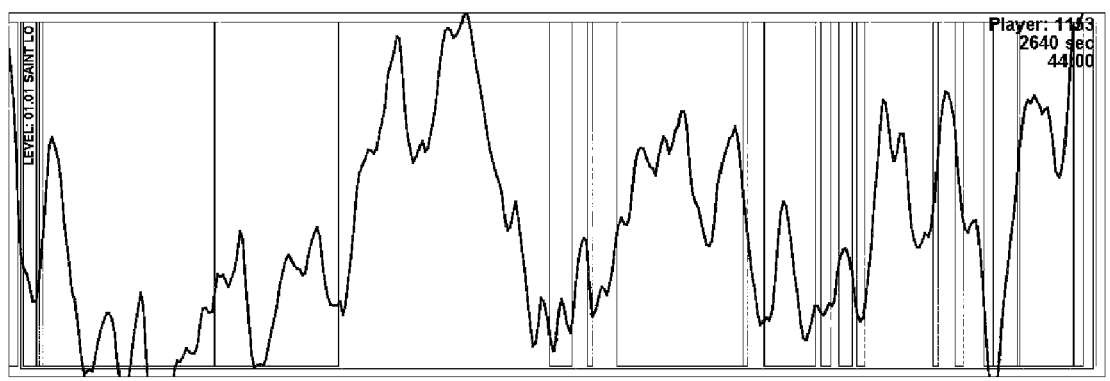
Figure 3:
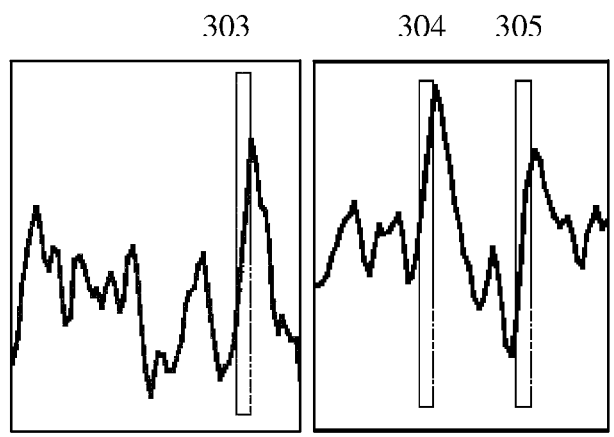

FIG. 3(a) shows an exemplary trace of the physiological response—"Engagement" for a player playing Call of Duty 3 on the Xbox 360. The trace is a time series, with the beginning of the session on the left and the end on the right. Two event instances 301 and 302 are circled, where 301 on the left shows low "Engagement" during a game play that happens during a boring tutorial section. 302 shows a high "Engagement" section that has been recorded when the player experiences the first battle of the game. FIG. 3(b) shows exemplary vertical lines that divide a piece of media instance into many events defining every important thing that a player of the video game or other media may encounter and/or interact with.

In some embodiments, the event defining module 104 is operable to define occurrence and duration of events in the media instance via at least the one or more of the following approaches. The events so identified by the event defining module 104 are then provided to the key event module 106 to test for "significance" as key events in the media instance as described below.

The hypothesis approach, which utilizes human hypothesis to identify events in the media instance, wherein such events shall be tested for significance as key events.

Figure 4:
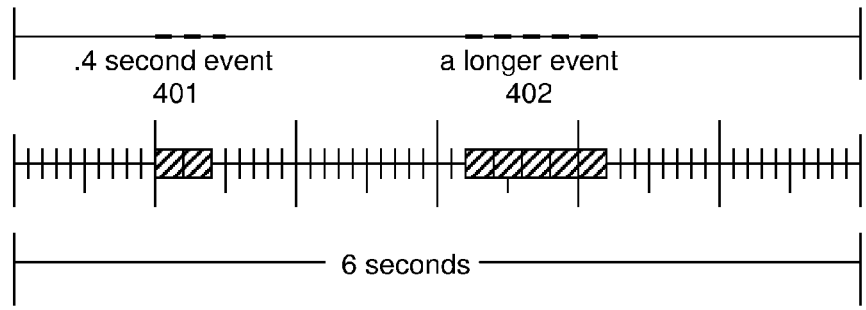
FIGS. 4(a)-(c) depict exemplary event identification results based on different event defining approaches.
Figure 4:
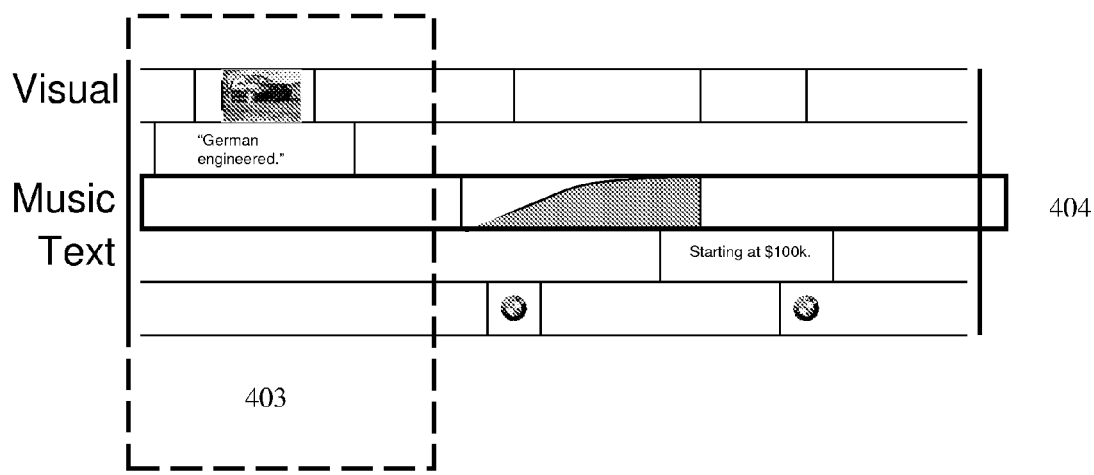
Figure 4:
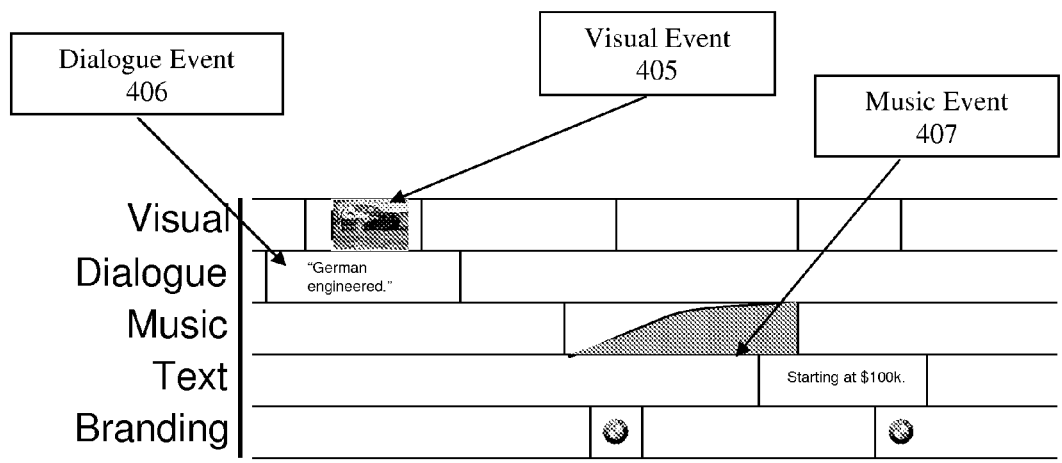

The small pieces or time shift approach, which breaks the media instance into small pieces in time, and scans each small piece for significant switch in the viewers' responses, wherein consecutive significant small pieces can be integrated as one key event. For the non-limiting example of FIG. 4(a), the small pieces are each ⅕ second in length and consecutive small pieces that are found to be significant indicate an event, such as 401 and 402. For the exemplary car ad shown in FIG. 4(b), 403 represents the first 10 seconds of the car ad as a cross-component event, and 404 represents a cross-ad music event.

The turning point approach, which finds where the aggregated physiological responses (traces), first derivative, and second derivative of aggregated trace(s) have roots and uses them as possible event cut points (delimiters). Here, roots of the aggregate traces can be interpreted as points when the viewers' aggregated physiological responses transition from above average to below average, or from positive to negative. Roots in the first derivative of the aggregate traces can be interpreted as 'turning points', at which the physiological responses transition from a state of increasing positivity to increasing negativity, or vice versa. Roots in the second derivative of the aggregate traces can also be interpreted as 'turning points', points, at which the physiological responses begin to slow down the rate of increase in positivity. All such roots are then collected in a set s. For every pair i,j of roots in the set s for which j occurs after i in the media instance, the event which starts at i and ends at j is tested for significance as a key event. Note here that i and j do not have to be consecutive in time.

The multi-component event approach, which breaks the media instance down into components and then divides each component into events. A media instance typically has many components. For a non-limiting example, an advertisement can have one or more of: voiceover, music, branding, and visual components. All points in the media instance for which there is a significant change in one of the components, such as when the voiceover starts and ends, can be human marked. As with the turning point approach, all the marked points can be collected in the set s. For every pair i,j of roots in the set s for which j occurs after i in the media instance, the event which starts at i and ends at j is tested for significance as a key event. While this approach requires greater initial human input, it may provide more precise, more robust results based on automated higher-level analysis and the benefits would outweigh the costs. For a non-limiting example, a car ad can be broken down into visual, dialogue, music, text, and branding components, each with one or more events. For the exemplary car ad shown in FIG. 4(c), 405 represents a visual event, 406 represents a dialogue event, and 407 represents a music event.

Key Events Identification

In some embodiments, the key event module 106 is operable to accept the events defined by the event defining module 104 and automatically spot statistically significant/important points in the aggregated physiological responses from the viewers relevant to identify the key moments/events in the media instance. More specifically, the key event module is operable to determine one or more of:

if an event polarizes the viewers, i.e., the physiological responses from the viewers are either strongly positive or strongly negative.

if the physiological responses vary significantly by a demographic factor.

if the physiological responses are significantly correlated with the survey results.

if an event ranks outstandingly high or low compared to similar events in other media instances For a non-limiting example, FIG. 3(c) shows two exemplary traces of the "Engagement" response of a video game player where the boxes 303, 304, and 305 in the pictures correspond to "weapon use" events. At each point where the events appear, "Engagement" rises sharply, indicating that the events are key events for the video game.

In some embodiments, the key events found can be used to improve the media instance. Here "improving the media instance" can be defined as, but is not limited to, changing the media instance so that it is more likely to achieve the goals of the interested party or creator of the media instance.

In some embodiments, the key event module 106 is further operable to establish a casual relationship between surveyed feelings about the media instance and the key events identified based on the physiological responses from the viewers. In other words, it establishes a correlation between the physiological responses from the viewers to key events in the media instance and a surveyed outcome, i.e., the viewers' reported feelings on a survey, and reports to the interested parties (e.g. creator of the event) which key events in the media instance actually caused the outcome. Here, the outcome can include but is not limited to, liking, effectiveness, purchase intent, post viewing product selection, etc. For a non-limiting example, if the viewers indicate on a survey that they did not like the media instance, something about the media instance might have caused them to feel this way. While the cause may be a reaction to the media instance in general, it can often be pinned down to a reaction to one or more key events in the media instance as discussed above. The established casual relationship explains why the viewers report on the survey their general feelings about the media instance the way they do without human input.

In some embodiments, the key event module 106 is operable to adopt multivariate regression analysis via a multivariate model that incorporates the physiological responses from the viewers as well as the surveyed feelings from the viewers to determine which events, on average, are key events in driving reported feelings (surveyed outcome) about the media instance. Here, the multivariate regression analysis examines the relationship among many factors (the independent variables) and a single, dependent variable, which variation is thought to be at least partially explained by the independent variables. For a non-limiting example, the amount of rain that falls on a given day varies, so there is variation in daily rainfall. Both the humidity in the air and the number of clouds in the sky on a given day can be hypothesized to explain this variation in daily rainfall. This hypothesis can be tested via multivariate regression, with daily rainfall as the dependent variable, and humidity and number of clouds as independent variables.

In some embodiments, the multivariate model may have each individual viewer's reactions to certain key events in the media instance as independent variables and their reported feeling about the media instance as the dependent variable. The coefficients from regressing the independent variables on the dependent variable would determine which key events are causing the reported feelings. Such a multivariate model could be adopted here to determine what set of key events most strongly affect reported feelings from the viewers about the media instance, such as a joke in an advertisement. One characterization of such event(s) is that the more positive (negative) the viewers respond to the event(s), the more likely the viewers were to express positive feelings about the media instance. For a non-limiting example, a multivariate regression can be run on multiples events (1, 2 . . . n) within an entire montage sequence of an advertisement to determine which events drive liking the most, using relationship between reported feelings about the ad and the emotional responses from the viewers to the events in the ad as input. The results of the multivariate regression runs shown in FIG. 5 indicate that 2 out of the 6 events tested in the ad drive the viewers' responses the most, while the other 4 events do not meet the threshold for explanatory power.

In an automated process, this multivariate regression may be run stepwise, which essentially tries various combinations of independent variables, determining which combination has the strongest explanatory power. This is a step toward creating the causal relationship between the viewers' responses to the events and their surveyed feelings about the media instance. For a non-limiting example, if response to joke #2 is correlated with indicated intent to purchase when holding genders and responses to jokes #1 and #3 constant, a causal conclusion can be made that joke #2 triggers the viewers' intent to purchase.

In some embodiments, the key event module 106 identifies the key polarizing event(s) that cause statistically significant difference in the surveyed outcome from different demographic groups of viewers and provides insight into, for non-limiting examples, why women do not like the show or which issue actually divides people in a political debate. The key event module 106 may collect demographic data from overall population of the viewers and categorize them into groups to differentiate the responses for the subset, wherein the viewers can be grouped one or more of: race, gender, age, education, demographics, income, buying habits, intent to purchase, and intent to tell. Such grouping information can be included in the regressions to determine how different groups report different reactions to the media instance in the survey. Furthermore, grouping/event response interaction variables can be included to determine how different groups respond differently to the key events in the media instance. For key events that are polarizing, demographic information and/or interaction variables of the viewers can also be included to the multivariate model capture the combined effect of the demographic factor and the reaction to the polarizing key events.

Figure 6:
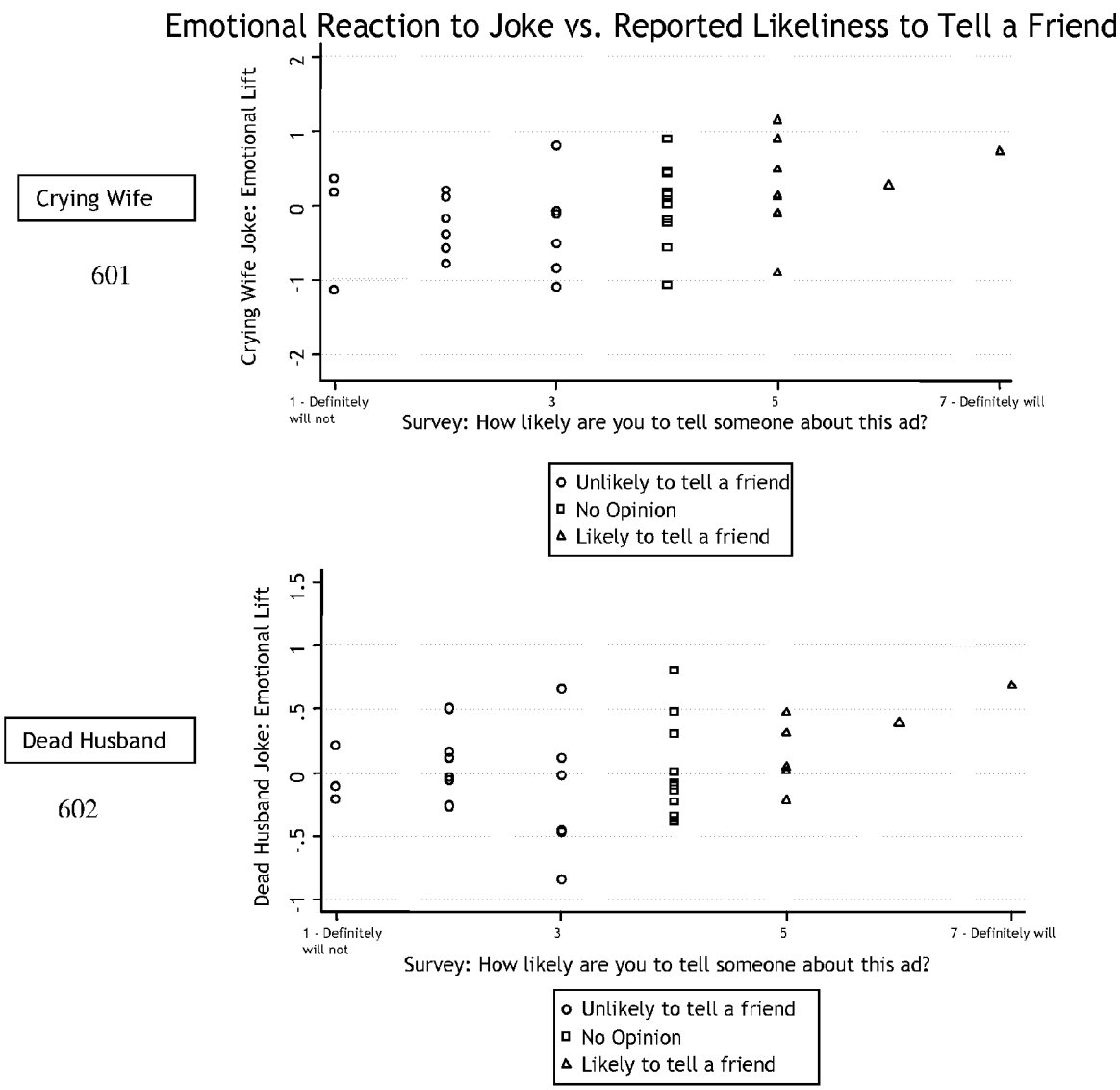
FIGS. 6(a)-(b) depict exemplary correlations between physiological responses from viewers to key jokes in an ad and the surveyed intent of the viewers to tell others about the ad.
Figure 6:
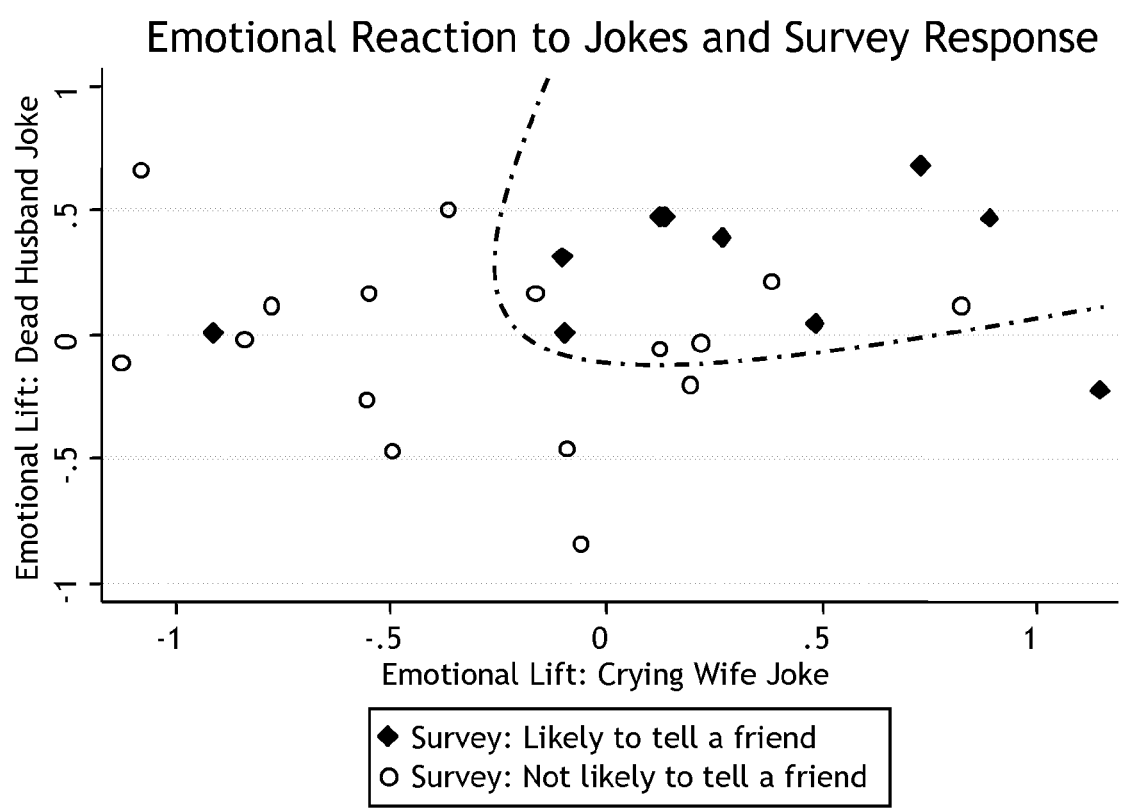

For a non-limiting example, the viewers of an ad can be first asked a survey question, "How likely are you to tell someone about this particular commercial—meaning tell a friend about this ad you've just seen" as shown in FIG. 6(a). The viewers of the ad are broken into two groups based on indicated likelihood to tell someone about the commercial—the affirmative group and the negative group, and it is assumed that the viewers in both groups are normally distributed with the same variance. The emotional responses from the viewers in the groups to two key jokes 601 and 602 in the ad are then compared to their surveyed reactions to test the following hypothesis—"the group that indicated they were likely to tell someone will have a stronger positive physiological response to the two key jokes than the group that indicated they were unlikely to tell someone." The affirmative group that indicated they were likely to tell a friend had, on average, a more positive reaction to both jokes than the negative group that indicated they were unlikely to tell a friend. In both cases, experiments using the change in individual liking as the metric to measure the physiological response rejects the null hypothesis—that there was no difference in emotional response to the jokes between the two groups—at above the 95% confidence level. Referring to graphs in FIG. 6(a), the X axis displays the testers' likelihood to tell a friend as indicated on the post-exposure survey and the Y axis displays the testers' emotional response to the joke. The triangles represent the "Go" people—those who indicated they were likely (to varying degrees) to tell their friend about the spot. The circles represent those who indicated that they were unlikely to do so. Note the upward trends—the more positive the emotional reaction to the joke, the greater indicated likelihood to tell a friend about the spot. FIG. 6(b) further summarizes the physiological responses to both jokes, where the reaction to the Crying Wife is on the X axis and the reaction to the Dead Husband is on the Y axis. An imaginary line around is drawn around the viewers who reacted relatively positively to both jokes. Note that this line corrals most of the black diamonds, which represent viewers who indicated they would tell a friend about the ad.

One embodiment may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

One embodiment includes a computer program product which is a machine readable medium (media) having instructions stored thereon/in which can be used to program one or more computing devices to perform any of the features presented herein. The machine readable medium can include, but is not limited to, one or more types of disks including floppy disks, optical discs, DVD, CD-ROMs, micro drive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data. Stored on any one of the computer readable medium (media), the present invention includes software for controlling both the hardware of the general purpose/specialized computer or microprocessor, and for enabling the computer or microprocessor to interact with a human viewer or other mechanism utilizing the results of the present invention. Such software may include, but is not limited to, device drivers, operating systems, execution environments/containers, and applications.

The foregoing description of the preferred embodiments of the present invention has been provided for the purposes of illustration and description. It is not intended to be exhaustive or to limit the invention to the precise forms disclosed. Many modifications and variations will be apparent to the practitioner skilled in the art. Particularly, while the concept "module" is used in the embodiments of the systems and methods described above, it will be evident that such concept can be interchangeably used with equivalent concepts such as, class, method, type, interface, bean, component, object model, and other suitable concepts. Embodiments were chosen and described in order to best describe the principles of the invention and its practical application, thereby enabling others skilled in the art to understand the invention, the various embodiments and with various modifications that are suited to the particular use contemplated. It is intended that the scope of the invention be defined by the following claims and their equivalents.

What is claimed is:

1. A method comprising:
   obtaining first physiological response data from a first subject exposed to media and second physiological response data from a second subject exposed to the media;
   aggregating the first physiological response data and the second physiological response data to form aggregated physiological response data;
   correlating the aggregated physiological response data to the media;
   processing, using a processor, the aggregated physiological response data to identify a first transition representative of a change between a positive response and a negative response;
   calculating, using the processor, a derivative of the aggregated physiological response data to identify a second transition representative of a change in rate of an increasing positive response, a decreasing positive response, an increasing negative response or a decreasing negative response;
   parsing the media into a plurality of events based on one or more of the first transition or the second transition;
   identifying a first one of the events as associated with an undesired physiological response; and
   identifying the first event as a candidate for modification based on the undesired response.

2. The method of claim 1, wherein the physiological response comprises one or more of a heart rate, a brain wave, an electroencephalographic signal, a blink rate, a breathing pattern, a motion, a muscle movement, a galvanic skin response or a change in emotion.

3. The method of claim 1 further comprising processing the aggregated physiological response data to identify a third transition representative of a change in aggregated physiological response data from above average to below average or from below average to above average.

4. The method of claim 1, wherein the first event is undesirable if the event polarizes the subjects.

5. The method of claim 1, wherein the first event is undesirable if the physiological response to the first event varies across a demographic factor.

6. The method of claim 1 further comprising:
   obtaining survey data from the first and second subjects; and
   running a multivariant regression analysis based on the first and second physiological response data and the survey data to determine which of the events drive the survey data.

7. The method of claim 1 further comprising parsing the media into the events based on hypothesized events.

8. The method of claim 1, wherein the media comprises one or more of a video, an audio, an advertisement, a move, a computer application, a printed media, a video game, a website, or a live performance.

9. A system, comprising:
   an interface to obtain first physiological response data from a first subject exposed to media and second physiological response data from a second subject exposed to the media; and
   a processor to:
      aggregate the first physiological response data and the second physiological response data to form aggregated physiological response data;
      correlate the aggregated physiological response data to the media;
      process the aggregated physiological response data to identify a first transition representative of a change between a positive response and a negative response;
      calculate a derivative of the aggregated physiological response data to identify a second transition representative of a change in rate of an increasing positive response, a decreasing positive response, an increasing negative response or a decreasing negative response;
      parse the media into a plurality of events based on one or more of the first transition or the second transition;
      identify a first one of the events as associated with an undesired physiological response; and
      identify the first event as a candidate for modification based on the undesired response.

10. The system of claim 9, wherein the physiological response comprises one or more of a heart rate, a brain wave, an electroencephalographic signal, a blink rate, a breathing pattern, a motion, a muscle movement, a galvanic skin response or a change in emotion.

11. The system of claim 9, wherein the processor is to process the aggregated physiological response data to identify a third transition representative of a change in aggregated physiological response data from above average to below average or from below average to above average.

12. The system of claim 9, wherein the first event is undesirable if the event polarizes the subjects.

13. The system of claim 9, wherein the first event is undesirable if the physiological response to the first event varies across a demographic factor.

14. The system of claim 9, wherein the interface is to obtain survey data from the first and second subjects, and the processor is to run a multivariant regression analysis based on the first and second physiological response data and the survey data to determine which of the events drive the survey data.

15. The system of claim 9, wherein the processor is to parse the media into the events based on hypothesized events.

16. The system of claim 9, wherein the media comprises one or more of a video, an audio, an advertisement, a move, a computer application, a printed media, a video game, a website, or a live performance.

17. A tangible machine readable storage device or storage disc comprising instructions, which when executed, cause a machine to at least:
 obtain first physiological response data from a first subject exposed to media and second physiological response data from a second subject exposed to the media;
 aggregate the first physiological response data and the second physiological response data to form aggregated physiological response data;
 correlate the aggregated physiological response data to the media;
 process the aggregated physiological response data to identify a first transition representative of a change between a positive response and a negative response;
 calculate a derivative of the aggregated physiological response data to identify a second transition representative of a change in rate of an increasing positive response, a decreasing positive response, an increasing negative response or a decreasing negative response;
 parse the media into a plurality of events based on one or more of the first transition or the second transition;
 identify a first one of the events as associated with an undesired physiological response; and
 identify the first event as a candidate for modification based on the undesired response.

18. The storage device or storage disc of claim 17, wherein the physiological response comprises one or more of a heart rate, a brain wave, an electroencephalographic signal, a blink rate, a breathing pattern, a motion, a muscle movement, a galvanic skin response or a change in emotion.

19. The storage device or storage disc of claim 17, wherein the instructions cause the machine to process the aggregated physiological response data to identify a third transition representative of a change in aggregated physiological response data from above average to below average or from below average to above average.

20. The storage device or storage disc of claim 17, wherein the first event is undesirable if the event polarizes the subjects.

21. The storage device or storage disc of claim 17, wherein the first event is undesirable if the physiological response to the first event varies across a demographic factor.

22. The storage device or storage disc of claim 17, wherein the instructions cause the machine to obtain survey data from the first and second subjects, and run a multivariant regression analysis based on the first and second physiological response data and the survey data to determine which of the events drive the survey data.

23. The storage device or storage disc of claim 17, wherein the instructions cause the machine to parse the media into the events based on hypothesized events.

24. The storage device or storage disc of claim 17, wherein the media comprises one or more of a video, an audio, an advertisement, a move, a computer application, a printed media, a video game, a website, or a live performance.

* * * * *